(12) United States Patent  
Vinther

(10) Patent No.: US 8,622,745 B2  
(45) Date of Patent: Jan. 7, 2014

(54) VISUAL STIMULOUS GAME

(76) Inventor: Franz Vinther, Karlslunde (DK)

( * ) Notice: Subject to any disclaimer, the term of this patent is extended or adjusted under 35 U.S.C. 154(b) by 15 days.

(21) Appl. No.: 13/182,391

(22) Filed: Jul. 13, 2011

(65) Prior Publication Data

US 2012/0064494 A1   Mar. 15, 2012

(30) Foreign Application Priority Data

Sep. 9, 2010   (DK) .............................. 2010 00171 U

(51) Int. Cl.
*G09B 9/00*   (2006.01)
(52) U.S. Cl.
USPC .......................................... 434/247; 434/258
(58) Field of Classification Search
USPC ......... 434/247, 128, 136, 156, 167–169, 173, 434/176–178, 188–191, 201, 236–238, 434/258–261, 308–309, 317, 322–365, 434/428–430; 463/7, 9, 15, 35–37; 446/129–139; 273/138.2, 153 R, 273/237–239, 282.1, 282.2, 282.3, 273/283–289, 440–456

See application file for complete search history.

(56) References Cited

U.S. PATENT DOCUMENTS

| | | | |
|---|---|---|---|
| 1,084,370 A | | 1/1914 | Smith |
| 3,116,929 A | | 1/1964 | Kernodle |
| 3,479,034 A | * | 11/1969 | Wagner .......................... 273/239 |
| 3,583,702 A | | 6/1971 | Glass et al. |
| 3,585,735 A | | 6/1971 | Miller |
| 3,674,272 A | | 7/1972 | Wszalek |
| 3,758,693 A | | 9/1973 | Ebert |
| 3,785,648 A | | 1/1974 | Kobayashi |
| 4,484,745 A | * | 11/1984 | Sleeper ..................... 273/157 R |
| 7,690,963 B2 | | 4/2010 | Whitehead |
| 2006/0090384 A1 | * | 5/2006 | Woodruff ......................... 40/544 |
| 2006/0255539 A1 | | 11/2006 | Webber |
| 2009/0243214 A1 | | 10/2009 | Kean |
| 2010/0066017 A1 | | 3/2010 | Gowri et al. |

* cited by examiner

*Primary Examiner* — Timothy A Musselman
(74) *Attorney, Agent, or Firm* — QuickPatents; Kevin Prince

(57) ABSTRACT

An aid is disclosed for a trainer teaching a student motor skills. A magnetically-inert shield receives a magnetically-inert screen fixed to the front side thereof. A token has a magnetically-attractive material, and a token controller has a first magnet, such that the token controller may be used to move the token around on the screen when the token controller is pressed up against the rear side of the shield. One of the screens may include at least one raised portion raised off of the front surface of the screen a distance sufficient to receive the token thereunder. Various activities and games may be played with the aid, revolving primarily about the student trying to grasp a token that is moved by the trainer about the screen.

13 Claims, 3 Drawing Sheets

VISUAL STIMULOUS GAME

CROSS-REFERENCE TO RELATED APPLICATIONS

This application claims the benefit of Danish Utility Model Application #BA 2010 00171, filed on Sep. 9, 2010, and incorporated herein by reference.

STATEMENT REGARDING FEDERALLY SPONSORED RESEARCH AND DEVELOPMENT

Not Applicable.

FIELD OF THE INVENTION

This invention relates to motor skills training, and more particularly to a visual stimulus game apparatus.

BACKGROUND OF THE INVENTION

Cognitive research has shown that motor skills, including ability to react quickly, are important for a child's general learning ability. In other words, children better learn math, ball handling and response speed workout. Smaller children, ½-3 years old, have a naturally ability to train these skills themselves. For example, balance ability is learned by standing and walking, and ball control comes by playing. Training and developing a child's reaction speed and motor skills have important positive consequences for the child's future learning ability.

There are several ways to construct a reactivity trainer. Presently it is common that the adult person (hereinafter called "the trainer") sits with the child or an injured person needing rehabilitation or other person in need of such training (hereinafter called "the student") and moves or manipulates various objects as the student in one way or another tries to find, touch, grab or catch the objects. But students can typically see the trainer's hand and arm movements and in this way can partially predict the motion of the moving object, thus reducing the training effectiveness.

Therefore, there is a need for a device that allows a trainer to develop motor skills in a student that is easy to use, inexpensive to manufacture, and allows for a variety of skill levels of the student. Such a needed device would shield the motion of the trainer's arm and hands from the student, and would provide feedback to the student of success. Such a needed invention would appear to be a game and would be fun for the student to use. The present invention accomplishes these objectives.

SUMMARY OF THE INVENTION

The present device is an aid for a trainer teaching a student motor skills to increase the student's visual reflexes, hand-eye coordination, and reflex speed. A shield has a substantially flat front side and rear side. The shield is made from a magnetically inert material, such as plastic, wood, cardboard, or the like. Further, the shield is preferably large enough to shield the motion of the trainer's hands from the student while in-use. At least one screen is fixed to the front side of the shield. Such a screen provides at least one camouflage means and is made from a magnetically inert material.

A token has a magnetically-attractive material proximate a bottom side thereof, and a token controller has a first magnet fixed proximate a top side thereof, such that the token controller may be used to move the token around on the screen when the token controller is pressed up against the rear side of the shield.

The camouflage means may include a pattern applied to a top side of the token and a similar pattern applied to a front surface of one of the at least one screens. As such, the token is visually difficult to discern against the screen when the token is stationary, but relatively easy to see when moving. Alternately, or perhaps in combination with the patterns, one of the screens may include at least one raised portion raised off of the front surface of the screen a distance sufficient to receive the token thereunder. As such, the trainer can move the token back and forth from under each raised portion to alternately raised above the front side of the shield, with at least one aperture formed therein through which the token may be seen and grasped by the student.

In one embodiment, the token further includes an electronic circuit that activates a stimulation transducer such as an audio speaker or LED when the student successfully grasps the token and removes the token from the screen.

In use, with one of the at least one screens fixed with the front side of the shield and the top side of the token controller placed against the rear side of the shield, and with the bottom side of the token placed on the screen and aligned with the token controller, the trainer may move the token controller about the rear side of the shield to move the toke correspondingly about the screen. The shield blocks the student from being able to determine the movements of the token by watching the movements of the trainer. Various activities and games may be played with the aid, revolving primarily about the student trying to grasp a token that is moved by the trainer about the screen.

Each shield and screen is made of a material that allows a magnetic field to penetrate. The trainer is now able, using magnetic force, to transfer his movement from the rear side of the shield to the front side of the screen using a magnet on one side of the screen and a magnet or a magnetic material on the other side of the screen. During training, the student must find and/or capture the token on the student side of the screen. The aim of the present invention is using screen separation and the magnetic transfer of the trainer's movements to maximize student focus exclusively to keep track of the token moving on the student side of the screen. This new increased effect of training is achieved by making the screen large enough to hide the trainer's forearm and hand, and that movements are transferred directly through the screen by means of magnetic force. It is desired also for training the children that this magnetic power is adjustable in force so that the child is able to seize and remove the token from the screen as proof that the subject is caught. This magnetic holding force between the token and the token controller must therefore be at the low end between 0.2 and 5 Newton. At the same time, the size of the token must be large enough that it cannot be swallowed by a toddler or small child.

The invention involves training that gets more difficult and more fun as the child grows in age and training. Many different screens may be developed, each requiring a different skill level for the student to be successful at "catching" the token. Variations of the camouflaged means of the present invention may include, but are not limited to, camouflaged paintings, raised "garages" to hide the magnet, screen with apertures where the token only appears infrequently, "3D" painting with many images similar to that of the token, thus camouflaging the token when it is stationary.

The present invention is a device that allows a trainer to develop motor skills in a student. The present device is easy to use, inexpensive to manufacture, and allows for a variety of skill levels of the student. The present invention shields the motion of the trainer's arm and hands from the student, and provides feedback to the student of success. The present invention resembles a game and is fun for the student to use. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
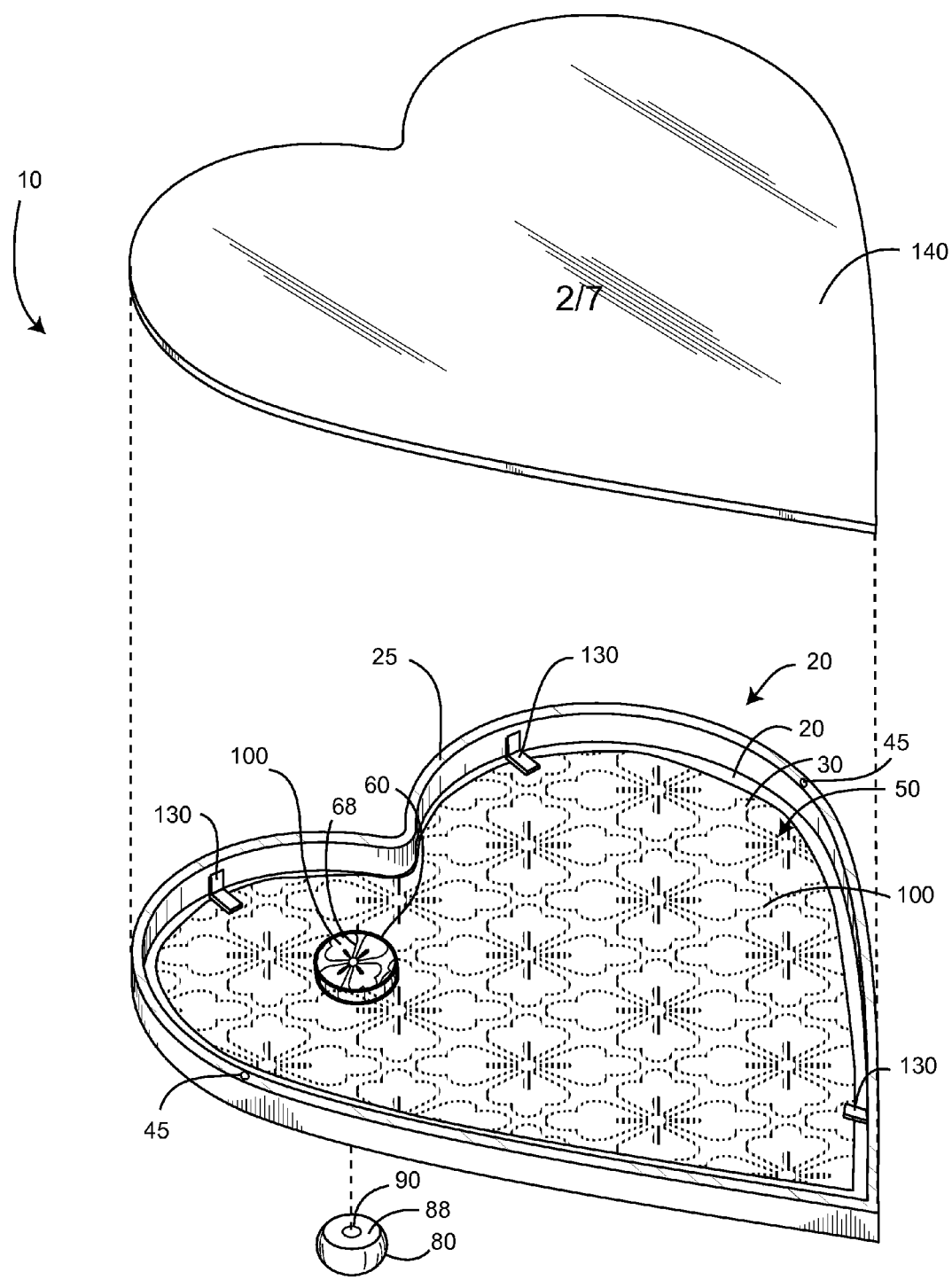
FIG. 1 is an exploded top perspective view of the invention.
Figure 2:
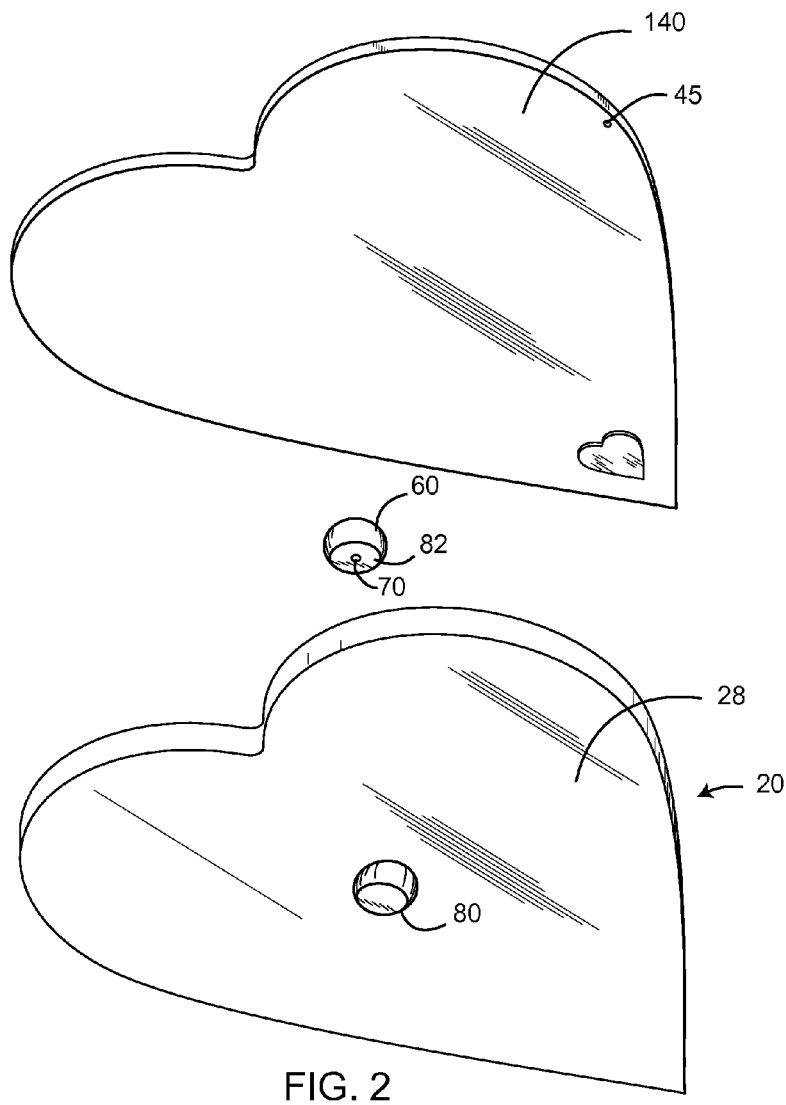
FIG. 2 is an exploded bottom perspective view of the invention.

FIGS. 1 and 2 illustrate an aid 10 for a trainer (not shown) teaching a student (not shown) motor skills to increase the student's visual reflexes, hand-eye coordination, and reflex speed. A shield 20 has a substantially flat front side 22 and rear side 28. The shield 20 is made from a magnetically inert material, such as plastic, wood, or the like. Further, the shield 20 is preferably large enough to shield the motion of the trainer's hands from the student while in-use, such as at least 6"×6" but preferably even larger. The shield 20 as shown in the illustrations takes the form of a heart shape, but could be any suitable shape such as square, rectangular, oval, round, clover-leaf, diamond, or the like.

Figure 3:
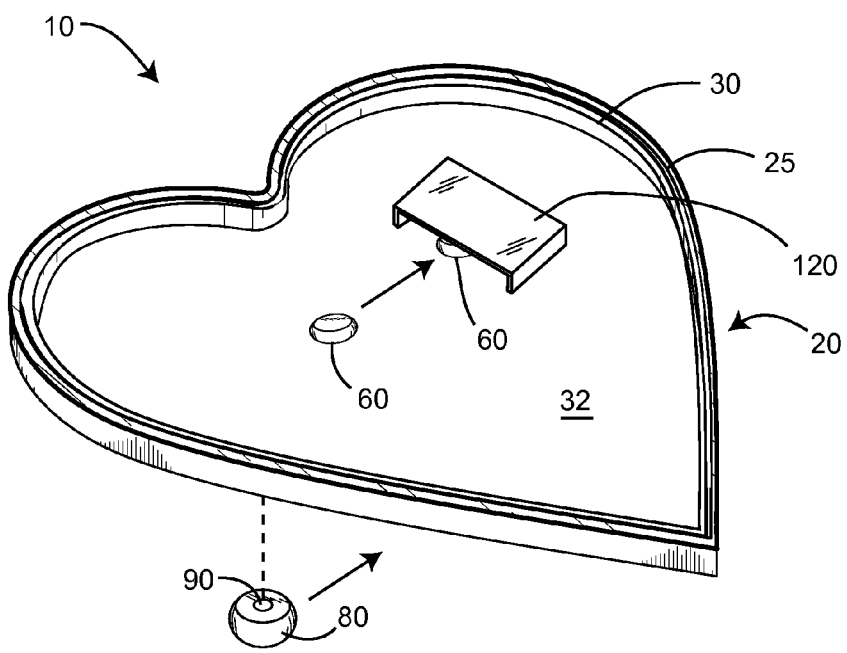
FIG. 3 is a perspective view of one embodiment of a screen as fitted into a shell of the present invention.

At least one screen 30 is fixed to the front side 22 of the shield 20 with an attachment means 40 and is made from a magnetically inert material, such as cardboard, plastic, or the like. The attachment means 40 may be a friction fit of each screen 30 within a raised border 25 of the shield 20 (FIG. 3), for example. Alternately, each screen 30 may be made from a cling vinyl type material so that static cling retains each screen on the front side 22 of the shield 20, static cling acting as the attachment means 40. Alternately, at least one mechanical fastener 130, such as a pair of magnets or clips (not shown), for example, may be used to mechanically fix each screen to the front side 22 of the shield 20.

A token 60 has a magnetically-attractive material 70 proximate a bottom side 62 thereof, and a token controller 80 has a first magnet 90 fixed proximate a top side 88 thereof, such that the token controller 80 may be used to move the token 60 around on the screen 30 when the token controller 80 pressed up against the rear side 28 of the shield 20. In one embodiment, the magnetically-attractive material 70 of the token 60 is a second magnet 75. In one embodiment (not shown), the token controller 80 has a plurality of magnets spaced apart such that a plurality of the tokens 60 may be used, all moving simultaneously but perhaps rotating with respect to each other as the trainer manipulates the token controller.

At least one of the screens 30 provides at least one camouflage means 50. The camouflage means 50 may include a pattern 100 applied to a top side 68 of the token 60 and a similar pattern 110 applied to a front surface 32 of one of the at least one screens 30. As such, the token 60 is visually difficult to discern against the screen 30 when the token 60 is stationary, but easy to see when moving.

Figure 4:
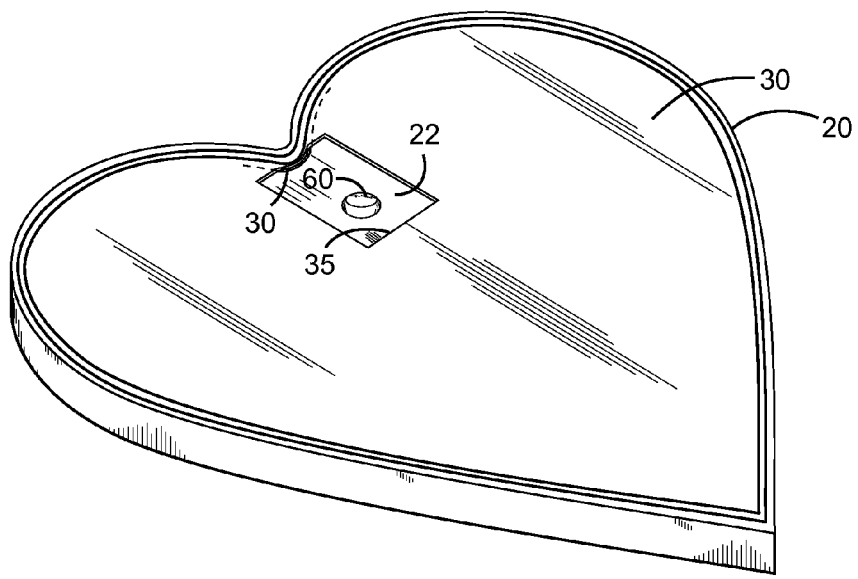
FIG. 4 is a perspective view of an alternate embodiment of a screen of the invention.

Alternately, or perhaps in combination with the patterns 100,110, one of the screens 30 may include at least one raised portion 120 (FIG. 3) raised off of the front surface 32 of the screen 30 a distance sufficient to receive the token 60 thereunder. As such, the trainer can move the token 60 back and forth from under each raised portion 120 to alternately show and then hide the token 60 from the student. In one embodiment, illustrated in FIG. 4, most of the screen 30 is raised above the front side 22 of the shield 20, with at least one aperture 35 formed therein through which the token 60 may be seen and grasped by the student.

In one embodiment, the token 60 further includes an electronic circuit 150 (FIG. 5) that has a power source 160, such as a battery, a stimulation transducer 170, and a normally-closed switch 180 that is configured to power the stimulation transducer 170 when closed. As such, when the token 60 is held against the screen 30 by the first magnet 90 of the token controller 80, the switch 180 is open. But when the student successfully grasps the token 60 and removes the token 60 from the screen 30, the switch 180 closes to activate the stimulation transducer 170. Such a stimulation transducer 170 may be an audio speaker, a vibration generator, at least one LED, or a combination thereof, for example. As such, when the student successfully grasps and removes the token 60 from the screen 30 the stimulation transducer 170 acts as an award to alert the student of success. The audio speaker, for example, may play a prerecorded sound clip of a crown applauding, for example, such a prerecorded sound clip being stored in a memory (not shown) of the electronic circuit 150.

Figure 5:
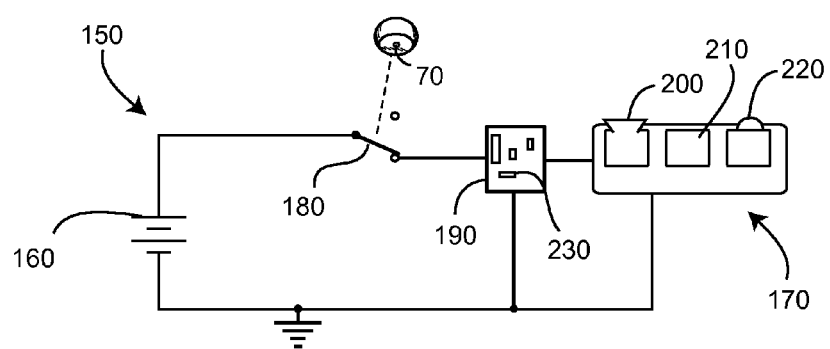
FIG. 5 is a circuit diagram of one embodiment of a token of the invention.

In such an embodiment, the electronic circuit 150 may further include a timing means 190, such as a timing circuit 230 (FIG. 5). As such, when the token 60 is removed from the screen 30, the switch 180 closes to activate the stimulation transducer 170 for a period of time determined by the timing means 190. Once the switch 180 is reopened, such as by applying it again to the screen 30, the timing means 190 resets.

In use, with one of the at least one screens 30 fixed with the front side 22 of the shield 20 and the top side 88 of the token controller 80 placed against the rear side 28 of the shield 20, and with the bottom side 62 of the token 60 placed on the screen 30 and aligned with the token controller 80, the trainer may move the token controller 80 about the rear side 28 of the shield 20 to move the toke 60 correspondingly about the screen 30. The shield 20 blocks the student from being able to determine the movements of the token 60 by watching the movements of the trainer. Various activities and games may be played with the aid 10, revolving primarily about the student trying to grasp a token 60 that is moved by the trainer about the screen 30. As the student progresses in his ability to successfully "catch" the token 60, the trainer may move the token 60 more quickly about the screen 30 to offer a greater challenge to the student, or another screen 30 may be installed on the shield 20 that provides more challenge to the student in grasping the token 60, for example.

A cover 140 may be included and adapted to close over the shield 20 and contain the token 60, token controller 80, and at least one of the shields 30 therebetween (FIGS. 1 and 2). Such a cover 140 may be magnetically fixed with the shield with at least one pair of magnets 145.

While a particular form of the invention has been illustrated and described, it will be apparent that various modifications can be made without departing from the spirit and scope of the invention. For example, various shapes of the shield 20 and screens 30 may be used other than those illustrated in the drawings. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An aid for a trainer teaching a student motor skills, comprising:
    a shield having a substantially flat front and rear sides, the shield being magnetically inert and larger than one-half square foot in area;
    a token having a magnetically-attractive material proximate a bottom side thereof;
    a token controller having a first magnet at a top side thereof that is magnetically attractive to the magnetically-attractive material of the token;
    at least one screen fixed to the front side of the shield with an attachment means, the screen being magnetically inert and providing at least one camouflage means, the camouflage means including a pattern applied to a top side of the token and a similar pattern applied to one of the at least one screens, such that when not being moved by the token controller, the location of the token is visually difficult to discern against the screen; and
    an electronic circuit having a power source, a stimulation transducer, and a normally-closed switch configured to power the stimulation transducer when closed;
    whereby with one of the at least one screen fixed with the front side of the shield and the top side of the token controller placed against the rear side of the shield, and with the bottom side of the token placed on the screen and aligned with the token controller, the trainer may move the token controller about the rear side of the shield to move the token correspondingly about the screen, the shield blocking the student from being able to determine the movements of the token by watching the movements of the trainer; and whereby when the token is held against the screen by the magnet of the token controller, the switch is open, but when the student successfully grasps the token and removes the token from the screen, the switch closes to activate the stimulation transducer.

2. The aid of claim 1 wherein at least one of the screens includes at least one raised portion raised off a front surface of the screen a distance sufficient to receive the token thereunder such that the trainer can move the token back and forth from under each raised portion to alternately show and then hide the token from the student.

3. The aid of claim 1 wherein the attachment means is a friction fit of each screen within a raised border of the shield.

4. The aid of claim 1 wherein the attachment means is static cling between each screen and the shield.

5. The aid of claim 1 wherein the attachment means is a mechanical fastener that mechanically fixes each screen to the front side of the shield.

6. The aid of claim 1 further including a cover adapted to close over the shield and contain the token, token controller, and at least one of the shields therebetween.

7. The aid of claim 6 wherein the cover is magnetically fixed with the shield.

8. The aid of claim 1 wherein the magnetically-attractive material is a second magnet.

9. The aid of claim 1 wherein the electronic circuit further includes a timing means, whereby when the token is removed from the screen, the switch closes to activate the stimulation transducer for a preset period of time determined by the timing means, the timing means configured to reset upon reopening of the switch.

10. The aid of claim 9 wherein the timing means is a timing circuit.

11. The aid of claim 1 wherein the stimulation transducer is an audio speaker.

12. The aid of claim 1 wherein the stimulation transducer is a tactile vibration generator.

13. The aid of claim 1 wherein the stimulation transducer is at least one LED.

* * * * *